United States Patent [19]
Grindle

[11] Patent Number: 5,813,944
[45] Date of Patent: Sep. 29, 1998

[54] HAND-OPERATED SPEED CONTROL APPARATUS FOR ATTACHMENT TO A MOTOR VEHICLE

[76] Inventor: George R. Grindle, 1226 Wilma Lois, Pasadena, Calif. 77502

[21] Appl. No.: 791,436

[22] Filed: Jan. 27, 1997

[51] Int. Cl.$^6$ ..................................................... B60K 41/20
[52] U.S. Cl. ............................ 477/209; 74/481; 74/501.6
[58] Field of Search ................................ 477/209; 74/481, 74/501.6

[56] References Cited

U.S. PATENT DOCUMENTS

| | | | |
|---|---|---|---|
| 4,998,983 | 3/1991 | Ruprecht et al. | 477/209 |
| 5,025,905 | 6/1991 | Lenz | 477/209 |
| 5,029,679 | 7/1991 | Kim et al. | 477/209 |
| 5,103,946 | 4/1992 | Masters et al. | 477/209 |
| 5,129,492 | 7/1992 | Lenz et al. | 477/209 |
| 5,282,522 | 2/1994 | Grindle | 477/209 |

OTHER PUBLICATIONS

Mobility Products & Design, Inc. Product brochure—4 pages (no date).
Wells–Engberg product brochure—"Right Angle Control"—2 pages (no date).
Wells–Engberg product brochure—"Instant Hand Control Installation"—2 pgs (1995).
McSquared Design product brochure—"The PHC III"—2 pages (no date).

*Primary Examiner*—Dirk Wright

[57] ABSTRACT

A speed-control device for attachment to the floorboard of a motor vehicle is disclosed which allows for the hand-operation of the acceleration and braking systems of the motor-vehicle, thereby assisting in making the motor vehicle more easily and readily operable by individuals having injured or disabled feet or legs. The device comprises a mounting bracket that supports a hand-operated lever and separate acceleration and brake levers, the latter two levers being attached to separate acceleration control and brake control cables, respectively, which in turn are attached to acceleration and brake assemblies, respectively.

6 Claims, 7 Drawing Sheets

HAND-OPERATED SPEED CONTROL APPARATUS FOR ATTACHMENT TO A MOTOR VEHICLE

BACKGROUND OF THE INVENTION

1. Field of the Invention:

The present invention is directed to a speed-control device for attachment to the floorboard of a motor vehicle which allows for the hand-operation of the acceleration and braking systems of the motor-vehicle, thereby assisting in making the motor vehicle more easily and readily operable by individuals having injured or disabled feet or legs. The device is particularly useful in providing connection of a hand operated mechanism which jointly enables use in operation of the brake pedal and the accelerator in a motor vehicle, such as an automobile, truck, or van.

2. Background of Invention:

Devices have been provided in the past which convert pedal-equipped automobiles for hand operation by those who have been injured or partially crippled. As a generalization, they include hand-operated devices which are often mounted on the steering column. For example, U.S. Pat. No. 4,998,983 shows a hand-operated system which mounts on the steering column. U.S. Pat. No. 5,025,905 shows a hand-operated system that has linkage rods which extend to the various pedals. In similar fashion, U.S. Pat. No. 5,029,679 shows a hand-operated control system which clamps to, or attaches by, means of rods to various pedal hangers. Additionally, U.S. Pat. No. 5,103,946 also mounts on the steering column and has linkage rods. In like fashion, U.S. Pat. No. 5,129,492 shows a set of connective rods.

An improved device is set forth in the inventor's earlier patent, U.S. Pat. No. 5,282,522 (hereafter "'522"), which is incorporated herein by reference in its entirety. As discussed in that patent, the inventor's earlier device comprises a mounting bracket that may be installed directly to the floorboard of the vehicle, thus avoiding the steering column connection as well as the rods which are installed to make such connections. The mounting bracket includes a base supporting a pair of support plates connected by a transverse mounting shaft. A hand-operated lever is secured to the mounting bracket and positioned between the support plates by the shaft, the latter of which enables the lever to rotate about an axis of rotation defined by the shaft. The lower portion of the lever includes a forwardly extending tab designed for attachment by a control cable that is further attached to an acceleration linkage. The lower portion of the lever further includes a rearward projecting crank portion which includes a long slot formed in it to provide for lost motion connection with a clevis attached to another control cable that actuates the brake assembly. As described in the '522 patent, to accelerate, the handle is moved forward, thereby pulling the cable attached to it rearward to actuate the acceleration linkage, carburetor, or acceleration linkage, depending upon the point of connection. To apply the brake, the lever is moved rearward, thereby pulling the cable attached to the opposite side of the lever forward to actuate the brakes.

SUMMARY OF THE INVENTION

The present invention is directed to a device for installation into a motor vehicle which allows for hand-operation of a vehicle by the driver; has all of the advantages of the device described in the inventor's earlier patent ('522) described above; and in addition, employs an improved design over the '522 device to provide even further advantages.

Specifically, the present invention includes:

(1) a mounting bracket having a pair of parallel support plates and a transverse mounting shaft connecting the plates;

(2) a hand-operated lever pivotly secured between the support plates by the mounting shaft, wherein the mounting shaft is seated within a corresponding transverse bore communicating through the lever between the front and rear sides of the lever. The hand-operated lever further has a proximal end for hand contact by the driver and a distal end having a first flange extending perpendicularly from the lever's front side and a second flange extending perpendicularly from the lever's rear side in a direction opposite the first flange extension;

(3) an acceleration lever pivotly secured by the mounting shaft between the hand-operated lever and one of the support plates; and a brake lever pivotly secured by the mounting shaft between the hand-operated lever and a second of the support plates such that the hand-operated lever is positioned between the acceleration and brake levers; the acceleration and brake levers each further have a transverse bore in registration and through which the mounting shaft is seated; the acceleration and brake levers also have front and rear edges positioned in sufficient proximity to the hand-operated lever such that the first flange overlaps the front edge of the acceleration lever and the second flange overlaps the rear edge of the brake lever;

(4) a first control cable secured at one end to the acceleration lever and extending to an acceleration assembly; and (5) a second control cable secured at one end to the brake lever and extending to a brake system; whereby when the hand-operated handle is rotated about the mounting shaft in a forward direction, the first flange comes in contact with the front edge of the acceleration lever to pivotly move the acceleration lever rearward, thereby pulling the first control cable rearward to actuate the acceleration assembly; and whereby when the hand-operated handle is rotated about the mounting shaft in a rearward direction, the second flange contacts the rear edge of the brake lever to pivotly move the brake lever forward, thereby pulling the second control cable forward to actuate the brake system.

Alternatively, the flanges on the hand-operated lever can be reversed, or the acceleration and brake levers reversed, such that the first flange overlaps the front edge of the brake lever and the second flange overlaps the rear edge of the acceleration lever; whereby when the hand-operated lever is rotated about the mounting shaft in a rearward direction, the second flange comes into contact with the rear edge of the acceleration lever to pivotly move the acceleration lever forward, thereby pulling the first control cable forward to actuate the acceleration assembly; and when the hand-operated handle is rotated about the mounting shaft in a forward direction, the first flange comes into contact with the front edge of the brake lever to pivotly move the brake lever rearward, thereby pulling the second control cable rearward to actuate the brake system.

A major structural difference between the present invention and the inventor's earlier design described in the '522 patent is that the present device includes independent levers that separately operate the brake system and acceleration assembly. In other words, there are no direct cable attachments to the hand-operated lever, but rather each control cable is connected to a separate acceleration lever or brake lever. In the '522 patent, both cables are attached to the hand-operated lever. While the advantages of the current invention over existing art include all of those present in the '522 design, the design differences of the present invention provide additional advantages compared to the '522 device, including, but not limited to, the following;

(1) The ability to custom-fit the hand-operated handle to the individual driver without affecting the cable connections to the device, since the cables are not directly attached to the hand-operated handle;

(2) The travel of the lever of the '522 device in the forward and rearward stroke is in the range of about 4 to 8 inches. The ability to change the stroke (i.e. make the stroke longer or shorter) is limited by the original length and height of mount of the lever. In the present invention, the stroke range can be more easily varied by changing the length of the acceleration and brake levers as well as the height of the hand-operated lever's mount relative to the floorboard;

(3) By employing separate levers for attachment to the acceleration and brake cables, simultaneous operation of the brake and acceleration assemblies is avoided, thereby reducing unnecessary strain on the engine and wear on the brake shoes; and (4) The present design is easier to manufacture and install.

DETAILED DESCRIPTION OF THE PREFERRED EMBODIMENTS

The present invention is directed to a speed-control device that may be installed directly to the floorboard of a motor vehicle and is designed such that the driver may operate the vehicle entirely by hand. The phrase "motor vehicle" as used herein refers to any car, truck, van, and the like wherein the acceleration and braking mechanism is conventionally foot-operated. The present invention is designed for easy installation onto the floorboard or center hump, as described in the inventor's earlier patent, U.S. Pat. No. 5,282,522 discussed above. Similar to the '522 device, the inventive device may be installed forward and to the right of the driver, thereby allowing the driver the option of operating the vehicle with the existing foot pedals, if desired, without having to avoid the hand-operated control device. Moreover, the connection of the device to the respective acceleration assembly and brake system is the same as described in the '522 patent.

Figure 1:
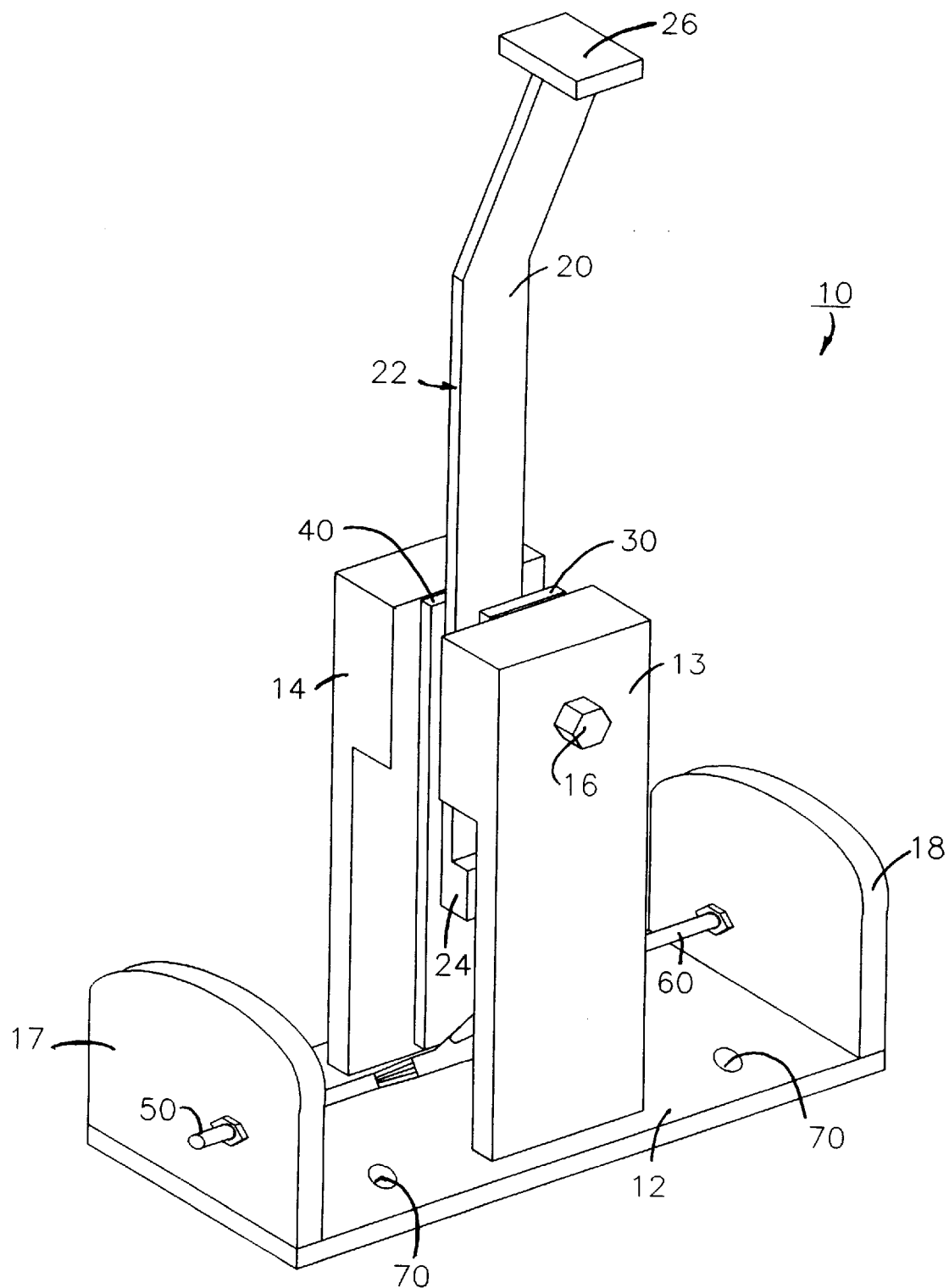
FIG. 1 is a perspective view of the present invention.
Figure 2:
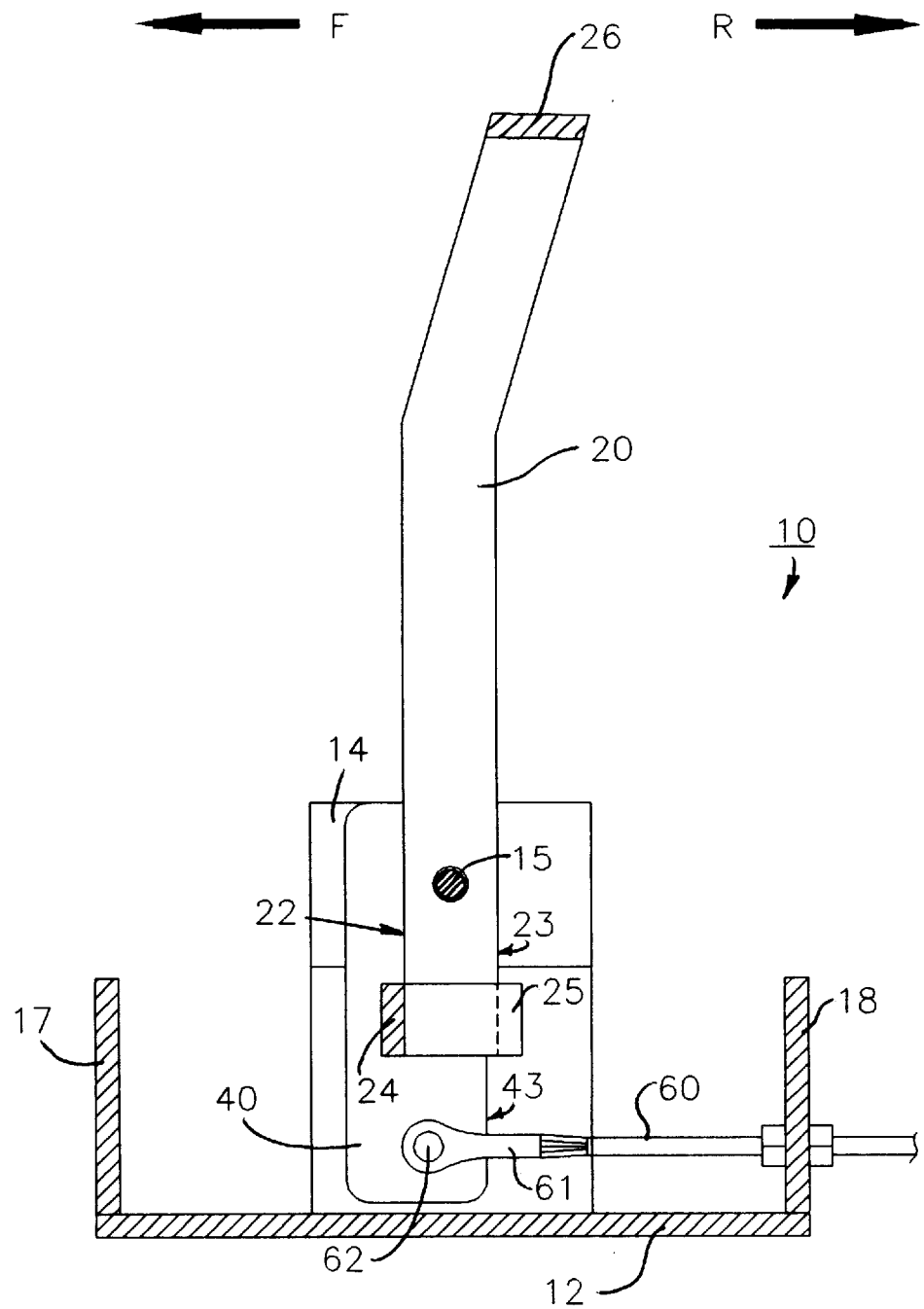
FIG. 2 is a side section view of the present invention along lines 2—2 of FIG. 3.
Figure 3:
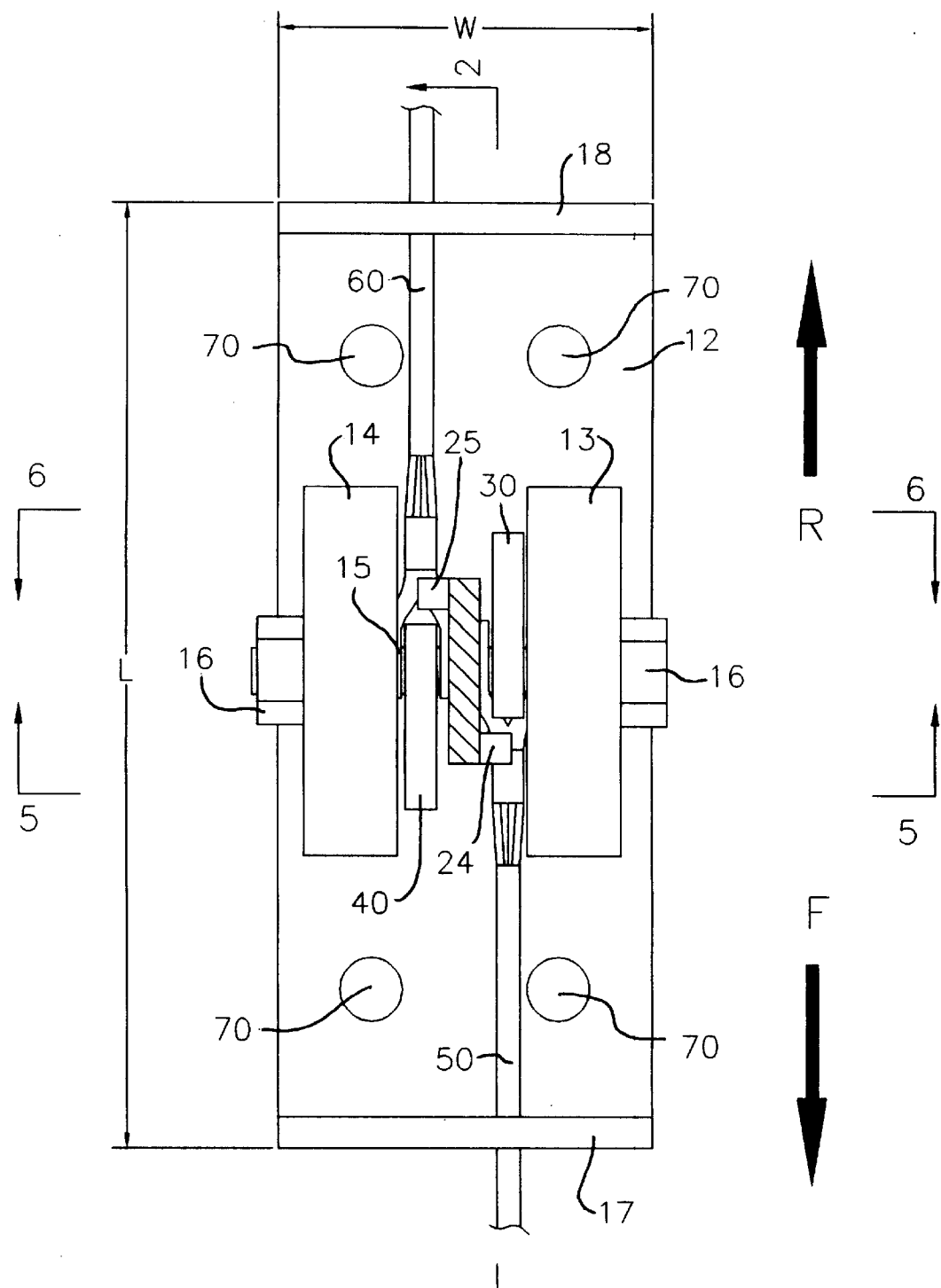
FIG. 3 is a top plan view the present invention.
Figure 4:
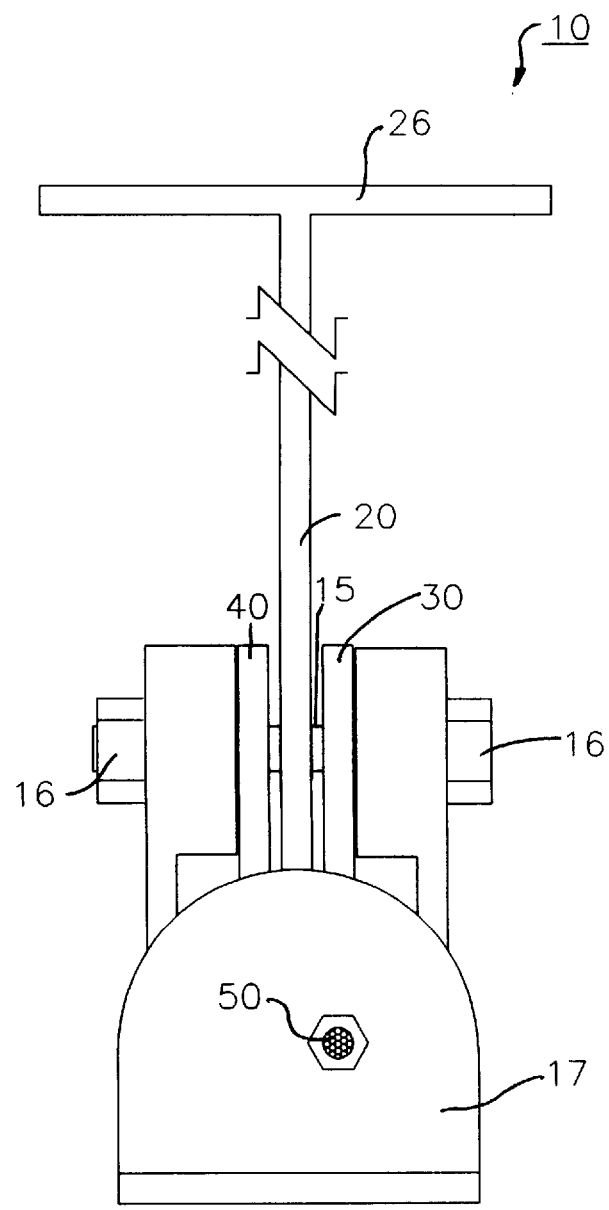
FIG. 4 is a front elevation vie w of the present invention.
Figure 5:
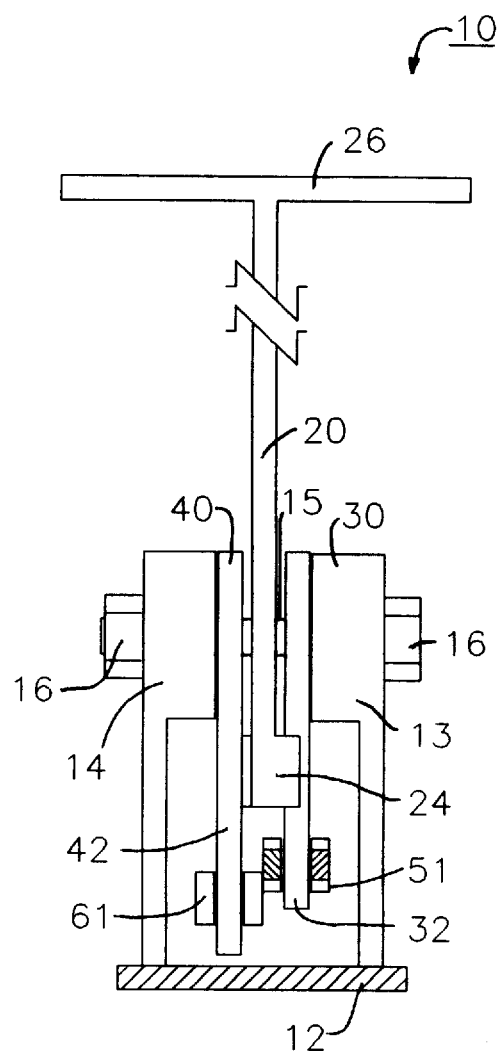
FIG. 5 is a front section view of the present invention taken along lines 5—5 of FIG. 3.
Figure 6:
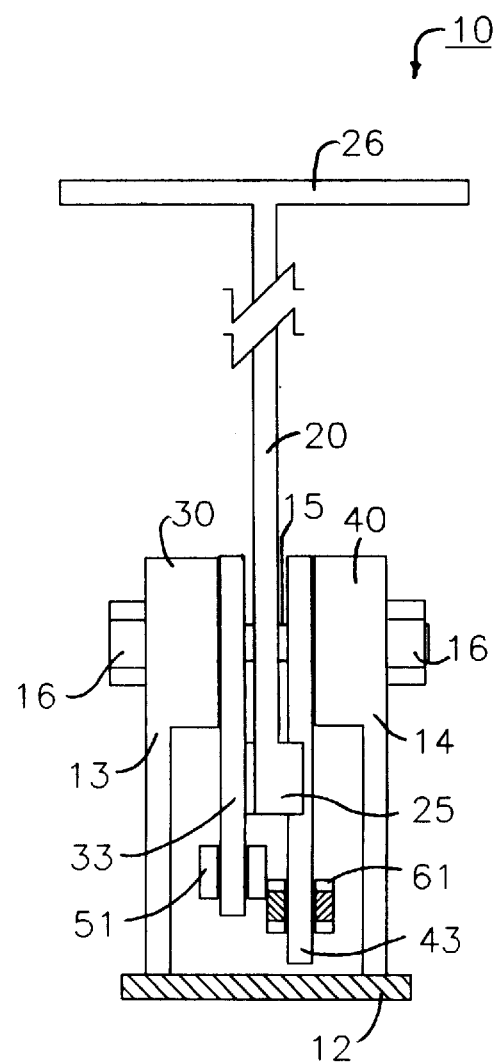
FIG. 6 is a rear section view of the present invention taken along lines 6—6 of FIG. 3.

Referring now to the figures, the inventive device (10), in certain aspects, comprises a mounting bracket preferably having a base plate (12) designed for attachment to the floorboard of the vehicle, as discussed in the '522 patent. Typical dimensions of the base plate range from about 2.5 inches to about 3 inches in width (W) and from about 8 inches to about 8.5 inches in length (L), as illustrated in FIG. 3. The base plate may also include at least one hole (70) through which a bolt (not shown), for example, may be inserted to engage the floorboard and secure the mounting bracket thereon. It will be recognized that other means commonly known by the those of ordinary skill in the art for securing the mounting bracket to the vehicle may be employed. The mounting bracket further includes a pair of parallel support plates (13, 14) supported on opposite sides of the base plate (12). Preferably, the support plates are configured such that the proximal ends have a greater thickness than the distal ends in order to provide sufficient clearance for the levers and control cables positioned therebetween, as best illustrated in FIGS. 1–3 and discussed in greater detail below.

Connecting the two support plates (13,14) proximally is a transverse mounting shaft (15) which is used, in part, for securing a hand-operated lever (20) to the mounting bracket. The mounting shaft (15) is seated within a transverse bore (21) communicating through the hand-operated lever (20) and provides a rotational pivot for the driver to control the vehicle by hand, as discussed further below.

The hand-operated lever (20) includes a distal end having one flange (24) extending perpendicularly from the front side (22) of the lever in the direction of one support plate (13). Similarly, the hand-operated lever (20) has a second distally positioned flange (25) extending perpendicularly from the rear side (23) of the lever in the direction of the second support plate (14) (i.e. in the opposite direction of the first flange extension). The purpose of the flanges will be discussed below in connection with the actual operation of the device.

Typical dimensions of the hand-operated lever (20) preferably range from about 0.25 to about 0.50 inches, more preferably about 0.25 inch, in thickness, and from about 1 to about 1.5 inches, more preferably 1.5 inches in width. Moreover, an added advantage of the device of the present invention is that the stroke of the device can be easily modified without affecting the brake and acceleration cable connections. For example, for a quadriplegic having limited hand movement capabilities, a short stroke (i.e. about 3 to 4 inches) is generally necessary to operate the device. To achieve this feature, a hand-operated lever having a longer length, preferably from about 8 to 9 inches, is required. Conversely, a paraplegic having full use of his/her arms and hands would not require such a short stroke, and thus a shorter lever of preferably from about 5 to 6 inches in length would suffice to provide the driver a longer stroke (i.e. about 6 to 8 inches).

Figure 7:
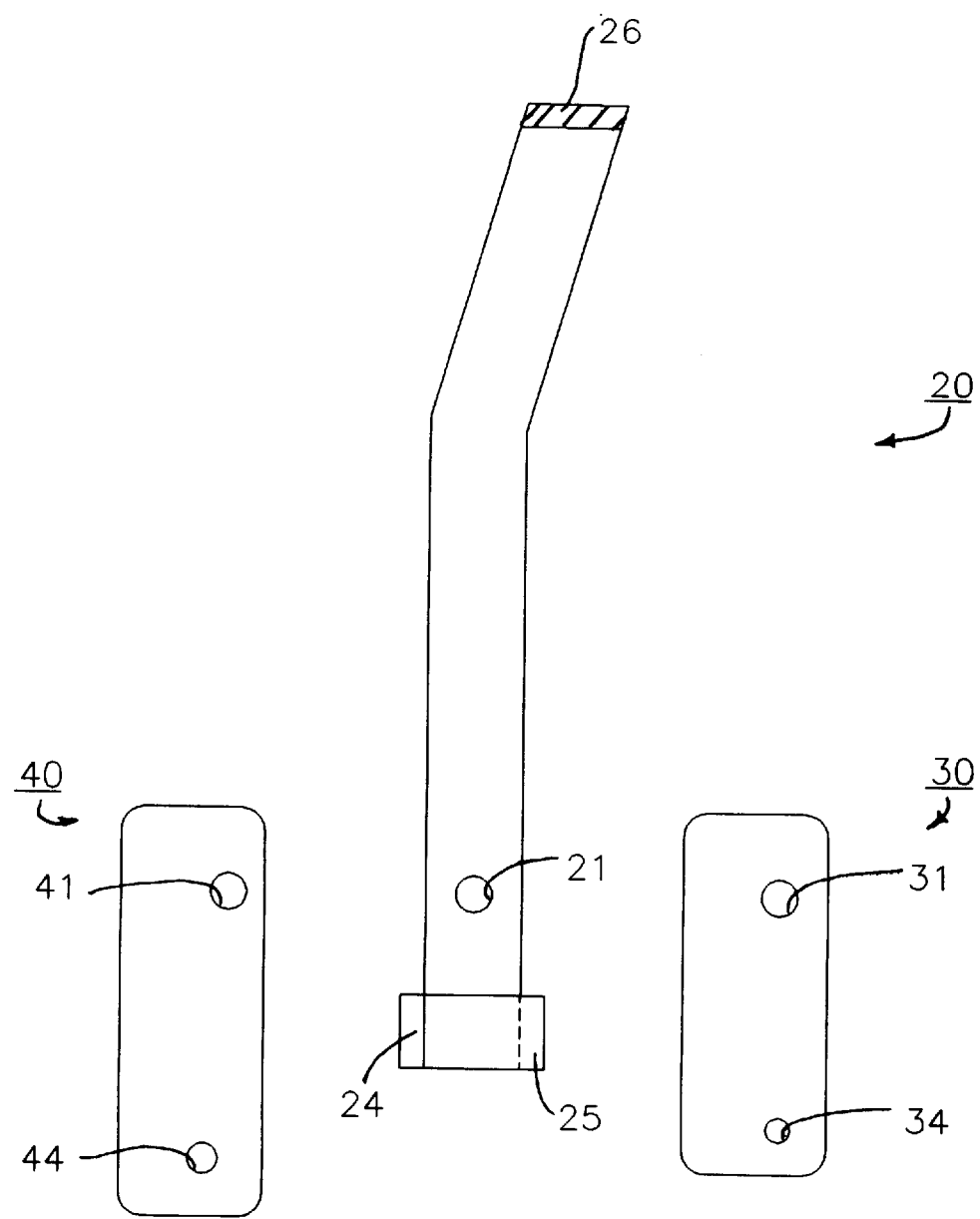
FIG. 7 is a perspective view of the brake, accelerator, and hand-operated levers of the present invention.

The inventive device further includes an acceleration lever (30) and a brake lever (40) positioned on opposite sides of the hand-operated lever (20). Like the hand-operated lever, the acceleration and brake levers each include transverse bores, generally indicated by reference numerals 31 and 41, respectively (FIG. 7), which are positioned in registration with one another such that the mounting shaft (15) may be seated therethrough to provide rotational pivot motion of both levers. The acceleration and brake levers (30, 40) are positioned sufficiently close to the hand-operated lever (20) such that the front flange (24) of the hand-operated lever (20) overlaps the front edge (32) of the acceleration lever (30), and the rear flange (25) of the hand-operated lever (20) overlaps the rear edge (43) of the brake lever (40), as shown. Conversely, it will be readily apparent to one of ordinary skill in the art, having the benefit of this invention's teachings and suggestions, that the acceleration and brake levers may be reversed, or the flanges on the hand-operated lever may be reversed, such that the front flange (24) overlaps the front edge (32) of the brake lever (42) and the rear flange (25) overlaps the rear edge (33) of the acceleration lever (30) (not shown).

The tension provided to the hand-operated lever (as well as to the acceleration and brake levers) may be controlled by adjusting the tightness of the bolt (16), preferably a shoulder bolt, used to secure the mounting shaft (15) to the support plates (13, 14). The more tightly the bolt is fastened, the greater friction there is among the levers within the mounting bracket, thereby requiring more strength on the part of the driver to rotate the hand-operated lever. For a quadriplegic, a smaller tension may be more desireable, and thus a less tightly fastened bolt would be preferable.

The inventive device (10) further includes a brake control cable (60) which is attached at one end to a brake assembly (not shown) and at the other end to the brake lever (40) as shown in the figures. A preferable attachment mechanism is illustrated in FIGS. 2–3, for example, whereby a clevis (61) is attached to one end of the control cable (60). The clevis (61), in turn, is then secured to the brake lever (40), preferably by further means of a second bore (44) (FIG. 7) positioned near the distal end of the lever (30) for engagement of a fastener (62) therein. It will be recognized that other mechanisms for attaching the brake control cable to the brake lever may be employed and are well within the scope of the present invention. Finally, the preferred attachment of the brake control cable to the brake assembly is the same as that described in the '522 patent.

The inventive device further includes an acceleration control cable (50) which is connected to an acceleration assembly (not shown) at one end and the accelerator lever (30) at the other end, as shown in the figures. As for the brake control cable discussed above, a preferable attachment mechanism comprises employment of a clevis (51) to one end of the control cable (50). The clevis (51), in turn, is then secured to the accelerator lever (30), preferably by further means of a second bore (34) positioned near the distal end of the lever (30) for engagement of a fastener therein. As for the brake control lever discussed in the preceding paragraph, it will be recognized that other mechanisms for attaching the cable to the acceleration lever may be employed and are well within the scope of the present invention. The means and point of attachment of the acceleration control cable to the acceleration assembly is the same as that described in the '522 patent. Thus, the control cable (50) may be connected either to the accelerator linkage so that movement in the direction of the linkage will advance the engine speed, or it may be connected directly to the carburetor for accomplishing the same result. The point of interconnection is preferably somewhere in the linkage system between the carburetor and the accelerator pedal. Consequently, the phrase "acceleration assembly" as used herein refers to either the carburetor, the accelerator, or the acceleration linkage, as described in the '522 patent.

In order to provide proper clearance of the control cables within the mounting bracket, it is preferable that one of the acceleration and brake levers be slightly shorter in length than the other. (Note the figures illustrate the acceleration lever being the shorter of the two; however, the brake lever could be the shorter lever, if desired). Typical dimensions of either lever (30, 40) range from about 4.5 inches to about 9 inches, more preferably about 6 inches in length, with one of the levers being from about 0.25 to about 0.50 inches shorter than the other lever. For better guidance and support of the brake and acceleration control cables (60, 50), the mounting bracket may be further provided with rear and front end plates (18, 17), each including a bore through which the specific control cable may pass and be supported.

A significant advantage of providing separate levers (30, 40) for cable attachment to the corresponding acceleration assembly and brake system is that the control cables are less likely to "kink" or twist during operation, as compared to the '522 device, where this is sometimes a problem. Moreover, provision of separate levers for operation of the acceleration assembly and brake system greatly minimizes the risk of actuating the accelerator and the brake simultaneously, which sometimes can occur when operating the '522 device, where both control cables are attached to the hand-operated lever.

The hand-operated lever (20) may include a proximally-positioned handle (26) which may be of any shape or design, preferably of such that will easily fit the user's hand. The surface of the grip can be metal or can be finished with surface enhancements such as by knurling. If desired, the surface can be provided with an enhancement for easy gripping such as by placement of a leather wrap on the surface. The surface, whether enhanced or not, enables the user to simply reach over and grasp the handle and hold the hand grip while moving the lever (20) in pivotal motion. It should also be noted that if desired, the handle, for example, could be modified to accommodate electrical controls for operating various components of the vehicle, including but limited to, the headlights, interior compartment lights, and the directional signals.

With reference to the particular embodiment illustrated in the figures, the vehicle is powered in the forward direction by moving the hand-operated lever (20) forward in the direction of arrow (F). The forward motion of the hand-operated lever (20) brings the front flange (24) in contact with the front edge (32) of the acceleration lever (30) to move the acceleration lever in the rearward direction (arrow (R)). Continual forward motion causes the front flange (24) to move the acceleration lever (30) further rearward, thereby pulling the acceleration control cable (50) rearward to actuate the accelerator assembly. Subsequent rearward movement of the hand-operated lever (20) causes deceleration without actuating the brake system until such time as the lever is moved further rearward until the rear flange (25) comes in contact with the rear edge (43) of the brake lever (40) to pivotally move the brake lever forward, thereby pulling the brake control cable (60) forward to actuate the brake system. Release of the brake can be accomplished by moving the hand-operated lever (20) forward again, but without engaging the acceleration lever (30) until such time as acceleration is desired.

Alternatively, if acceleration by forward motion of the hand-operated lever and braking by rearward motion of the hand-operated lever is desired, the device may be readily and simply modified as discussed earlier (i.e. the positioning of the brake and acceleration levers may be reversed relative to the hand-operated lever, or the position of the flanges on the hand-operated lever may be reversed).

The device may be fabricated of any suitable, durable material, although metal or metal alloys, such as stainless steels, for example, are most preferred.

The foregoing disclosure and description of the invention are illustrative and explanatory thereof, and various changes in the size, shape, and materials, as well as in the details of the illustrated construction may be made without departing from the spirit of the invention.

I claim:

1. A device for attachment to a motor vehicle to enable hand operation by a driver of said motor vehicle, said device comprising:

(a) a mounting bracket comprising a pair of parallel support plates and a transverse mounting shaft connecting said plates;

(b) a hand-operated lever having front and rear sides, said lever pivotly secured between said support plates by said mounting shaft, wherein said mounting shaft is seated within a corresponding transverse bore communicating through said lever between said front and rear sides;

(c) said hand-operated lever further including a proximal end for hand-contact by said driver and a distal end, said distal end further having a first flange extending perpendicularly from said front side and a second flange extending perpendicularly from said rear side in a direction opposite said first flange extension;

(d) an acceleration lever pivotly secured by said mounting shaft between said hand-operated lever and one of said support plates, and a brake lever pivotly secured by said mounting shaft between said hand-operated lever and a second of said support plates such that said hand-operated lever is positioned between said acceleration and brake levers, said acceleration and brake levers each having a transverse bore in registration and through which said mounting shaft is seated;

(e) said acceleration and brake levers each further including front and rear edges positioned in sufficient proximity to said hand-operated lever such that said first flange overlaps said front edge of said acceleration lever and said second flange overlaps said rear edge of said brake lever; and (f) a first control cable secured at one end to said acceleration lever, said first control cable further extending to an acceleration assembly; and a second control cable secured at one end to said brake lever, said second control cable further extending to a brake system;

whereby when said hand-operated handle is rotated about said mounting shaft in a forward direction, said first flange contacts said front edge of said acceleration lever to pivotly move said acceleration lever rearward, thereby pulling said first control cable rearward to actuate said acceleration assembly; and whereby when said hand-operated handle is rotated about said mounting shaft in a rearward direction, said second flange contacts said rear edge of said brake lever to pivotly move said brake lever forward, thereby pulling said second control cable forward to actuate said brake system.

2. The device of claim 1, wherein said mounting bracket further includes a base plate for attachment to a floorboard of said motor vehicle, said base plate having front and rear ends and two sides adjacent said front and rear ends for supporting said pair of parallel support plates thereon.

3. The device of claim 2, wherein said mounting bracket further includes at least one end plate positioned perpendicular to said base plate on at least one of said front and rear ends, said end plate having a bore communicating through said end plate for guiding one of said first and second control cables therethrough.

4. A device for attachment to a motor vehicle to enable hand operation by a driver of said motor vehicle, said device comprising:

(a) a mounting bracket comprising a pair of parallel support plates and a transverse mounting shaft connecting said plates;

(b) a hand-operated lever having front and rear sides, said lever pivotly secured between said support plates by said mounting shaft, wherein said mounting shaft is housed within a corresponding transverse bore communicating through said lever between said front and rear sides;

(c) said hand-operated lever further including a proximal end for hand-contact by said driver and a distal end, said distal end further having a first flange extending perpendicularly from said front side and a second flange extending perpendicularly from said rear side in a direction opposite said first flange extension;

(d) an acceleration lever pivotly secured by said mounting shaft between said hand-operated lever and one of said support plates, and a brake lever pivotly secured by said mounting shaft between said hand-operated lever and a second of said support plates such that said hand-operated lever is positioned between said acceleration and brake levers, said acceleration and brake levers each having a transverse bore in registration and through which said mounting shaft is seated;

(e) said acceleration and brake levers each further including front and rear edges positioned in sufficient proximity to said hand-operated lever such that said first flange overlaps said front edge of said brake lever and said second flange overlaps said rear edge of said acceleration lever; and (f) a first control cable secured at one end to said acceleration lever, said first control cable further extending to an acceleration assembly; and a second control cable secured at one end to said brake lever, said second control cable further extending to a brake system;

whereby when said hand-operated handle is rotated about said mounting shaft in a rearward direction, said second flange contacts said rear edge of said acceleration lever to pivotly move said acceleration lever forward, thereby pulling said first control cable forward to actuate said acceleration assembly; and whereby when said hand-operated handle is rotated about said mounting shaft in a forward direction, said first flange contacts said front edge of said brake lever to pivotly move said brake lever rearward, thereby pulling said second control cable rearward to actuate said brake system.

5. The device of claim 4, wherein said mounting bracket further includes a base plate for attachment to a floorboard of said motor vehicle, said base plate having front and rear ends and two sides adjacent said front and rear ends for supporting said pair of parallel support plates thereon.

6. The device of claim 5, wherein said mounting bracket further includes at least one end plate positioned perpendicular to said base plate on at least one of said front and rear ends, said end plate having a bore communicating through said end plate for guiding one of said first and second control cables therethrough.

* * * * *